April 26, 1960 SHIGERU MITA ET AL 2,934,638

TRANSCEIVER SWITCHING SYSTEM USING A TRAVELING WAVE TUBE AND MAGNETIC GYRATOR

Filed Aug. 15, 1955

INVENTORS
SHIGERU MITA &
SHUICHI HAYASHI
BY Wenderoth, Lind & Ponack
Attys.

United States Patent Office 2,934,638

Patented Apr. 26, 1960

2,934,638

TRANSCEIVER SWITCHING SYSTEM USING A TRAVELING WAVE TUBE AND MAGNETIC GYRATOR

Shigeru Mita, Shinagawa-ku, Tokyo, and Shuichi Hayashi, Kanagawa-ku, Yokohama, Japan, assignors to Tokyo Shibaura Electric Co., Ltd., Kawasakishi, Japan Application August 15, 1955, Serial No. 528,371

2 Claims. (Cl. 250—13)

The present invention relates to a transceiver system and more particularly to a transceiver system wherein, in a duplexer consisting of a transmitter, receiver antenna and a non-reciprocal branching circuit having three terminals is used and a traveling wave tube is connected at the forward stage of the receiving apparatus.

The branch circuit in a pulse duplexer such as for a radar has hitherto been constructed mainly by using a microwave switching gas discharge tube such as a TR tube or an ATR tube. However, such a TR tube or an ATR tube has defects in that it is short-lived because water is enclosed therein, in that its construction is so complicated that its price is high, and further in that its long line effect cannot be prevented.

The first point of the present invention is to apply a traveling-wave tube for the duplexer system taking advantage of a new phenomenon, wherein the traveling-wave tube acts as an amplifier tube for weak signals, but it comes out as an attenuator for large signals, for instance, a leakage power from the transmitting apparatus. Also a duplexer used for a non-reciprocal branching circuit having three terminals, especially a Faraday-rotor duplexer, is useful to realize the transceiver system of the present invention. Of course the Faraday-rotor duplexer used as a non-reciprocal branching circuit having three terminals and a traveling-wave tube used as a wide-band micro-wave amplifier have been already known respectively. However it has not been known to utilize the new behavior of the traveling-wave tube as above mentioned, and one can build an excellent duplexer with it.

Merits of the new system of this invention are stated as follows:

(1) It has a long life. Compared with an ordinary radar duplexer employed TR or ART tubes whose lives are 500 hours, the life of traveling-wave tubes are more than 5000 hours.

(2) The noise figure can be decreased. In the new system, the noise figure of the receiving apparatus depends on only that of traveling-wave tube and not on a mixer crystal, and the noise figure of crystals cannot be expected less than 9 db. However the noise figure of the traveling-wave tubes has been already reported as 5.5 db.

(3) A long line effect can be suppressed. This is natural, because the non-reciprocal element is employed.

An object of the present invention is to provide a small loss transceiver system fully utilizing, the decoupling characteristics of a non-reciprocal branching circuit having three terminals.

Another object of the present invention is to provide a transceiver system wherein the leakage power of the transmitting apparatus output to the receiving apparatus side will be damped, by connecting a traveling-wave tube at the forward stage of a receiving apparatus.

A further object of the present invention is to provide a transceiving apparatus which is suitable as a duplexer in a super high frequency wave or super ultra-short wave apparatus.

The other objects and advantages of the present invention will be made clear by the following explanations with reference to the drawings.

According to the present invention, in a duplexer circuit with which a transmitting apparatus and a receiving apparatus are connected through a branch circuit, a traveling wave tube amplifier is inserted in the position of the forward stage of the receiving apparatus in the receiver branching circuit, and the behaviour of amplification of said traveling wave tube amplifier is effectively utilized.

As well known, the traveling wave tube is so formed that waves may pass along a spiral passage arranged in the axial direction of the tube. As the waves travel along said spiral passage, the electric fields will become parallel to the axis of the tube and the velocity of the waves will decrease. When an electron beam of the same velocity as said electric fields is applied to said spiral passage, said waves will be amplified. And even if the reflected power due to the mismatch remains as a delayed circuit wave, it will be absorbed by a resistant substance layer provided on the tube wall and stable amplification will take place. When the input power is too large, the input power which is not matched with the travelling waves, will become energy to be transmitted to the output side as a delayed circuit wave but will also be absorbed or attenuated by said resistant layer. The behaviour of amplification of said traveling wave tube is such that the amplified output will increase in accordance with the increase of the input in the early period as shown by curve *a* in Fig. 1, and then will become maximum at a certain input P as shown at A and will thereafter decrease in accordance with the increase of the input. If the point on the curve at which an output equal to the input is obtained is made B, the range of OAB is a range wherein an amplifying action exists. This is called an amplification range. The range between B and C is a range wherein an attenuating action is present. This is called an attenuation range. The theoretical reason why the traveling wave tube has such input-output characteristics as are mentioned above is not yet definitely established. However, the large signal character of said traveling wave is recognized to be due to the following two reasons:

(1) When the microwave input becomes large, the action in the direction at right angles with respect to the direction of the travel of the electron beam will no longer become negligible in relation to the electron beam and the amplifying action will be reduced by "overbunching" wherein the electric field in said direction at right angles acts so as to enlarge the electron current beam.

(2) When the microwave input power becomes too large, the amplifying action will be reduced so that the action between the electron current beam with the input wave voltage gets out of synchronization.

Figure 2:
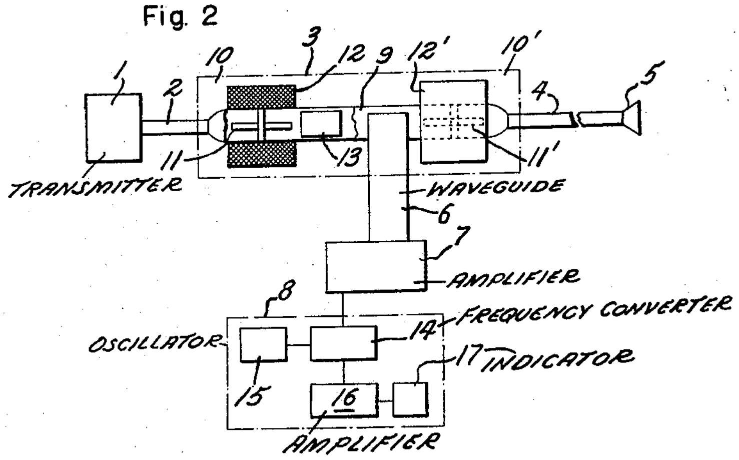
Fig. 2 is a circuit diagram showing an embodiment of the present invention.

Fig. 2 shows an example of a duplexer system for radar wherein the output power of the pulse transmitter 1 is led to branch circuit 3 through rectangular waveguide 2. The output power is further fed to antenna 5 through rectangular waveguite 4 and is radiated therefrom. A receiving input wave coming into antenna 5 is fed to branch circuit 3 through waveguide 4, and is taken out through branch waveguide 6, and is fed to receiving apparatus 8 through traveling wave tube amplifier 7.

Said branch circuit 3 is a kind of non-reciprocal branch circuit wherein two Faraday plates are used. Waveguide 9 of circular cross-section is provided with Faraday rotators 10 and 10′ which rotate the plane of polarization of waves passing through the circular waveguide by I 45 degrees relative to each other. Said Faraday rotators 10 and 10′ comprise cylindrical Faraday plates 11 and 11′ which are supported along the axis of the tube and made, for example, of a ferrite oxide, and electromagnetic coils 12 and 12′ located on the outside periphery of the tube so as to surround said plates respectively. Reflecting plate 13 made of an electric conductor is inserted in wave guide 9 so that, in case a transmitting wave has been rotated 45° by Faraday rotator 2, the reflecting plate may be at right angles to said wave. Therefore, the surface of reflecting plate 13 will be parallel with the receiving wave rotated by 45° by rotator 12′ so that the receiving wave will be reflected by reflecting plate 12 and the thus reflected wave will be led out by branching rectangular waveguide 6 which is mounted on the circular waveguide 9 between the two Faraday rotators 11 and 11′. Receiving apparatus 8 consists of a crystal frequency converter 14, a local oscillator 15, and amplifier 16 and an indicator 17. Receiving wave and the output of local oscillator 15 are mixed in the frequency converter 14, and the intermediate frequency output produced therefrom is amplified by amplifier 16 and is fed to indicator 17. Indicator 17 receives said amplified wave and indicates the features of it.

Figure 1:
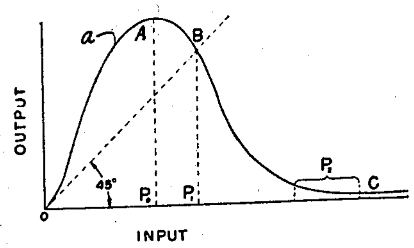
Fig. 1 is a diagram to explain the large signal character of a traveling wave tube.

In traveling wave tube amplifier 7, at the time of reception, the input of the receiving wave from branch circuit 6 is selected to correspond to point $P_0$, or somewhat lower than point $P_0$ shown in Fig. 1. Thus, it is amplified in the amplifying range and fed to the receiving apparatus. At the time of transmission, a part of the output of the transmitting apparatus leaked from branching waveguide 6 of branch circuit 3 to the circuit on the side of the receiving apparatus is too large, so that said output comes to attenuating range BC in the behaviour of amplification. For example, the peak value of the transmitting output of a radar will be several tens of kilo-watts. As the decoupling quantity of branch circuit 3 for said output may be about 30 decibels, the transmitting output leaked to branch tube 6 will be about several tens of watts. When the output is sent to the receiving apparatus in this state, crystal frequency converter 14 will be broken. However, if a traveling wave tube the $P_0$ of which is around 50 milliwatts, is used in the traveling wave tube amplifier, the above mentioned input of about several tens of watts will be able to be made to correspond with an attenuation range such that the leakage power of output will be considerably attenuated, and in the above mentioned example, the attenuation will be able to reach to at least 30 decibels and if adding with the component of the attenuation in the branch circuit, the overall attenuation will make up more than 60 decibels.

Figure 3:
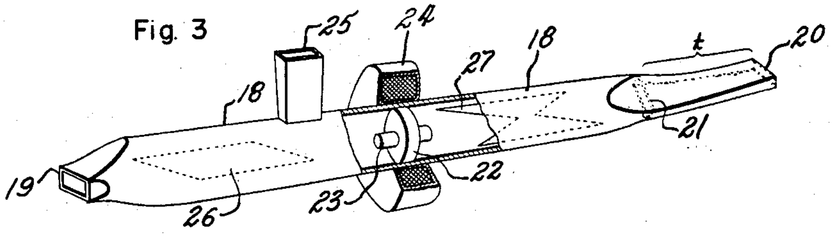
Fig. 3 is a partly sectioned perspective view showing another type of irreversible branching circuit having three terminals applicable to the system of the present invention.

An irreversible branch circuit having three terminals wherein a waveguide having a Faraday plate is combined with an H plane branch is shown in Fig. 3. In this example, both ends 19 and 20 of waveguide 18 are formed as a waveguide with a rectangular cross-section. Interval $t$ between boundary 21 between the circular wave tube part and the rectangular waveguide part and rectangular end 20 of the rectangular waveguide is in the form of a twisted rectangular tube. The rectangular cross-section at boundary point 21 is at an angle of 45° with rectangular openings 19 and 20 at both ends. In the intermediate part of circular waveguide 18, bar-shaped body 23 is supported by an annular insulator 22. Said bar-shaped body 23 is made of a magnetic material such as ferrite and is arranged along the longitudinal axis of waveguide 18. Electromagnetic coil 24 is fitted on the outside of waveguide 18 so as to be coaxial with said bar-shaped magnetic body. Said electro-magnetic coil 24 rotates the oscillating plane of the wave traveling in the axial direction of magnetic body 23 by 45°. H plane branch 25 is disposed between a Faraday plate 23 and rectangular end opening 19 at 90° with the oscillating plane of the wave introduced through rectangular end 19 of circular waveguide 18. Conductor 26 which allows the passage of the wave entering through rectangular end 19 and reflects the wave at right angles to said wave is inserted between rectangular end 19 and H plane branch 25. Electrically conductive plate 27 which allows the passage of the wave entering through rectangular end 20 and coming through twisted portion $t$ and which absorbs the wave having an oscillating plane at an angle with said wave is inserted between wave rotating piece 22 and boundary point 21.

Figure 4:
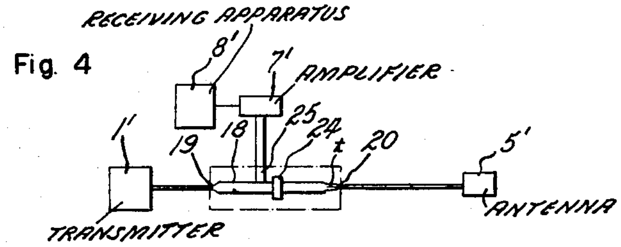
Fig. 4 is a circuit diagram showing the transceiver system of the present invention wherein the irreversible branching circuit having three terminals shown in Fig. 3 is used.

Fig. 4 shows an embodiment of the present invention wherein the irreversible branch circuit having three terminals shown in Fig. 3 is used. The output wave of the transmitting apparatus 11 is fed to first branch 19 of an irreversible three branch circuit. This wave travels through a circular waveguide and has its oscillating plane rotated by 45° by Faraday plate 22. This rotated wave is restored to its original oscillating plane by twisted portion $t$ and is led out through second branch 20. This led out wave is then fed to antenna 5′ and is radiated therefrom. The wave coming into antenna 5′ is introduced into twisted waveguide $t$, is deflected 45° by being passed through said tube $t$, is then introduced into circular waveguide 18 and is rotated by 45° by Faraday plate 22. The incoming signal which has been rotated by 45° by said plate 22 is thus at an angle of 90° to the oscillating plane of the transmitted output wave passing through twisted part $t$. Therefore, it is reflected by plate 26 within circular waveguide 18 and is led out through third branch 25. This led out wave is sent to amplifying traveling wave tube 7′ and is amplified here. This amplified wave is fed to receiving apparatus 8′ which is the next step. In this embodiment, too, even if a part of the comparatively large output wave of the transmitting apparatus leaks to the receiving apparatus through the third branch, it will be attenuated by the amplifying characteristics of the traveling wave tube and the receiving apparatus will operate stably without being obstructed by the component of the leak.

In addition to the above, there is a three branch circuit known as a three terminal circuit of transverse magnetic field type among irreversible three branch circuits which can be used for the present invention.

We claim:

1. A transceiver system comprising a transmitting apparatus, an antenna, a three terminal non-reciprocal branching circuit having a first terminal connected to said transmitting apparatus and a second terminal connected to said antenna for passing a signal from said transmitting apparatus to said antenna, said branching circuit having at least one Faraday rotator therein, and having a third terminal between said first and second terminals, a traveling wave tube for amplifying a weak signal while attenuating a strong signal and having one end connected to said third terminal for receiving an incoming signal from said antenna through said branching circuit, and a receiving apparatus connected to the other end of said traveling wave tube.

2. A transceiver system comprising a transmitting apparatus, an antenna, a three terminal non-reciprocal branching circuit having a first terminal connected to said transmitting apparatus and a second terminal connected to said antenna for passing a signal from said transmitting apparatus to said antenna, said branching circuit having two Faraday rotators therein for rotating waves 45° in opposite directions, and having a third terminal between said first and second terminals and between said Faraday rotators, a traveling wave tube for amplifying a weak signal while attenuating a strong signal and having one end connected to said third terminal for receiving an incoming signal from said antenna through said branching circuit, and a receiving apparatus connected to the other end of said traveling wave tube.

References Cited in the file of this patent

UNITED STATES PATENTS

| | | |
|---|---|---|
| 2,603,743 | Lawson | July 15, 1952 |
| 2,644,930 | Luhrs | July 7, 1953 |
| 2,660,689 | Touraton | Nov. 24, 1953 |
| 2,771,565 | Bryant et al. | Nov. 20, 1956 |
| 2,782,299 | Whitehorn | Feb. 19, 1957 |
| 2,790,927 | Pierce | Apr. 30, 1957 |
| 2,840,820 | Southworth | June 24, 1958 |
| 2,850,624 | Kales | Sept. 2, 1958 |
| 2,850,705 | Chait et al. | Sept. 2, 1958 |

OTHER REFERENCES

Hogan: "The Ferromagnetic Faraday Effect," Bell System Technical Journal, vol. 31, January 1952, pp. 1–31.